(12) United States Patent
Kobayashi et al.

(10) Patent No.: US 10,381,834 B1
(45) Date of Patent: Aug. 13, 2019

(54) POWER CONDITIONER AND POWER SYSTEM

(71) Applicant: OMRON Corporation, Kyoto (JP)

(72) Inventors: Kenji Kobayashi, Moriyama (JP); Kazumi Tsuchimichi, Kyoto (JP); Wataru Okada, Kizugawa (JP); Mamoru Yoshida, Kusatsu (JP); Gun Eto, Kusatsu (JP); Koji Fujita, Kusatsu (JP); Takayoshi Tawaragi, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/219,915

(22) Filed: Dec. 13, 2018

(30) Foreign Application Priority Data

Mar. 8, 2018  (JP) .................. 2018-042236
Jun. 27, 2018  (JP) .................. 2018-122351

(51) Int. Cl.
*H02J 3/38* (2006.01)
*H02J 3/32* (2006.01)
*H02H 7/122* (2006.01)
*H02M 7/537* (2006.01)
*H02M 3/158* (2006.01)
*H02M 1/00* (2006.01)

(52) U.S. Cl.
CPC .............. *H02J 3/38* (2013.01); *H02H 7/122* (2013.01); *H02J 3/32* (2013.01); *H02M 3/1584* (2013.01); *H02M 7/537* (2013.01); *H02M 2001/007* (2013.01)

(58) Field of Classification Search
CPC .... H02M 3/156; H02M 3/158; H02M 3/1584; H02M 7/537; H02M 2001/007; H02J 3/32; H02J 3/38; H02H 7/122
See application file for complete search history.

(56) References Cited

U.S. PATENT DOCUMENTS 7,301,790 B2 * 11/2007 Li ................. H02M 7/5387
363/132
8,297,389 B2 * 10/2012 Takizawa ........... B60L 3/0092
180/65.265
9,450,515 B2 * 9/2016 Chen .................... H02M 7/48
(Continued)

FOREIGN PATENT DOCUMENTS

EP          2738927 A1 * 6/2014 ............. H02J 1/102
JP          2009089541    4/2009
JP          2012222908   11/2012

*Primary Examiner* — Matthew V Nguyen
(74) *Attorney, Agent, or Firm* — JCIPRNET

(57) ABSTRACT

The disclosure reduces the size and cost of a power conditioner. A power conditioner including a DC/DC converter connected to a power supply device and an inverter connected to the DC/DC converter includes: a plus side wiring connecting the DC/DC converter and the inverter; a minus side wiring connecting the DC/DC converter and the inverter; a capacitor having one end connected to the plus side wiring and an other end connected to the minus side wiring; and a fuse provided on the minus side wiring, wherein the DC/DC converter has at least one switching element; the other end of the capacitor is connected to a first connection point provided on the minus side wiring on the DC/DC converter side with respect to the fuse; and the switching element is connected to a second connection point provided on the minus side wiring on the inverter side with respect to the fuse.

12 Claims, 8 Drawing Sheets

(56) References Cited

U.S. PATENT DOCUMENTS

| | | | |
|---|---|---|---|
| 9,614,427 B2* | 4/2017 | Berger | H02M 1/44 |
| 2016/0072281 A1* | 3/2016 | Izumi | G05B 15/02 |
| | | | 700/296 |
| 2017/0133857 A1* | 5/2017 | Sun | H02J 3/385 |
| 2018/0034386 A1* | 2/2018 | Okuda | H02M 3/155 |

* cited by examiner ns are adopted. That
POWER CONDITIONER AND POWER SYSTEM

CROSS-REFERENCE TO RELATED APPLICATION

This application claims the priority of Japan patent application serial no. 2018-042236, filed on Mar. 8, 2018 and Japan patent application serial no. 2018-122351, filed on Jun. 27, 2018. The entirety of the above-mentioned patent application is hereby incorporated by reference herein and made a part of this specification.

BACKGROUND

Technical Field

The disclosure relates to a power conditioner and a power system.

Description of Related Art

A power conditioner for stepping up the voltage of direct current (DC) power obtained by a photovoltaic cell with a DC/DC converter, converting the DC power into alternating current (AC) power, and then outputting the AC power to a power system is known (with reference to Patent Document 1, for example). A hybrid power conditioner (with reference to Patent Document 2, for example) capable of converting power obtained by a photovoltaic cell array into a AC and supplying the AC to an AC load (an electric product) and/or a power system and capable of charging surplus power to a storage battery has been put to practical use.

RELATED ART

Patent Document

[Patent Document 1] Japanese Laid-open No. 2009-089541
[Patent Document 2] Japanese Laid-open No. 2012-222908

FIG. 9 is a configuration diagram of a conventional power conditioner 101. A storage battery unit 102 and a power system 103 are connected to the power conditioner 101. The power conditioner 101 includes a DC/DC converter 111 for stepping up the voltage of the DC power outputted from the storage battery unit 102 and a DC/AC inverter 112 for converting the DC power inputted from the DC/DC converter 111 into AC power and outputting the AC power to the power system 103. In addition, the DC/DC converter 111 steps down the voltage of the DC power outputted from the DC/AC inverter 112. The power conditioner 101 includes a smoothing capacitor 113 and fuses 114 and 115. The smoothing capacitor 113 is disposed between the DC/DC converter 111 and the DC/AC inverter 112. One end of the smoothing capacitor 113 is connected to a plus side wiring 116 for connecting the DC/DC converter 111 and the DC/AC inverter 112. An other end of the smoothing capacitor 113 is connected to a minus side wiring 117 for connecting the DC/DC converter 111 and the DC/AC inverter 112. The fuses 114 and 115 are provided on the plus side wiring 116. The fuses 114 and 115 blow when a current exceeding the rating flows through the plus side wiring 116 and disconnect the plus side wiring 116.

The DC/DC converter 111 includes a reactor (a choke coil) 121, switching elements 122 and 123, and a smoothing capacitor 124. In a case where a short circuit current exceeding the rating flows through the plus side wiring 116 due to the malfunctions or failures of the switching elements 122 and 123, the fuse 114 blows, whereby the plus side wiring 116 is disconnected. Further, in a case where a short circuit current exceeding the rating flows through the plus side wiring 116 due to the malfunctions or failures of switching elements included in the DC/AC inverter 112, the fuse 115 blows, whereby the plus side wiring 116 is disconnected. By disconnecting the plus side wiring 116 in this way, the inflow of abnormal currents from the power conditioner 101 to the storage battery unit 102 is suppressed, and the failure of the storage battery unit 102 is avoided. Further, the inflow of abnormal currents from the storage battery unit 102 to the power conditioner 101 is suppressed, and the failure of the power conditioner 101 is avoided. As shown in FIG. 9, the fuse 114 is disposed on a side of the DC/DC converter 111, and the fuse 115 is disposed on a side of the DC/AC inverter 112. Therefore, the number of parts of the power conditioner 101 is increased, and there is a problem that the size and cost of the power conditioner 101 are increased. The disclosure reduces the number of parts of the power conditioner and to reduce the size and cost of the power conditioner.

SUMMARY

In the disclosure, the following means are adopted. That is, a first aspect of the disclosure is a power conditioner including a first DC/DC converter connected to a power supply device and an inverter connected to the first DC/DC converter, and the power conditioner includes: a plus side wiring for connecting the first DC/DC converter and the inverter; a minus side wiring for connecting the first DC/DC converter and the inverter; a first capacitor having one end connected to the plus side wiring and having an other end connected to the minus side wiring; and a fuse provided on the minus side wiring, wherein the first DC/DC converter has at least one switching element, and the other end of the first capacitor is connected to a first connection point provided on the minus side wiring on a side of the first DC/DC converter with respect to the fuse, and the switching element is connected to a second connection point provided on the minus side wiring on a side of the inverter with respect to the fuse.

A second aspect of the disclosure is a power system including a power conditioner and a chopper device, wherein the power conditioner includes: a first DC/DC converter connected to a power supply device and having at least one switching element; an inverter connected to the first DC/DC converter; a plus side wiring for connecting the first DC/DC converter and the inverter; a minus side wiring for connecting the first DC/DC converter and the inverter; a capacitor having one end connected to the plus side wiring and having an other end connected to the minus side wiring; a fuse provided on the minus side wiring; and a connection wiring for connecting the switching element to the minus side wiring, and the chopper device includes: a second DC/DC converter connected to a power supply device; a plus side connection wiring connected to the second DC/DC converter; and a minus side connection wiring connected to the second DC/DC converter, and the other end of the capacitor is connected to a first connection point provided on the minus side wiring on a side of the first DC/DC converter with respect to the fuse, and the switching element is connected to a second connection point provided on the minus side wiring on a side of the inverter with respect to the fuse, and the plus side connection wiring is connected to the plus side wiring, and the minus side connection wiring is connected to the minus side wiring on the side of the inverter with respect to the fuse or is connected to the connection wiring.

DESCRIPTION OF THE EMBODIMENTS

Hereinafter, embodiments will be described with reference to the drawings. The following embodiments are an aspect of the disclosure and do not limit the technical scope of the disclosure.

Applicable Example

Figure 1:
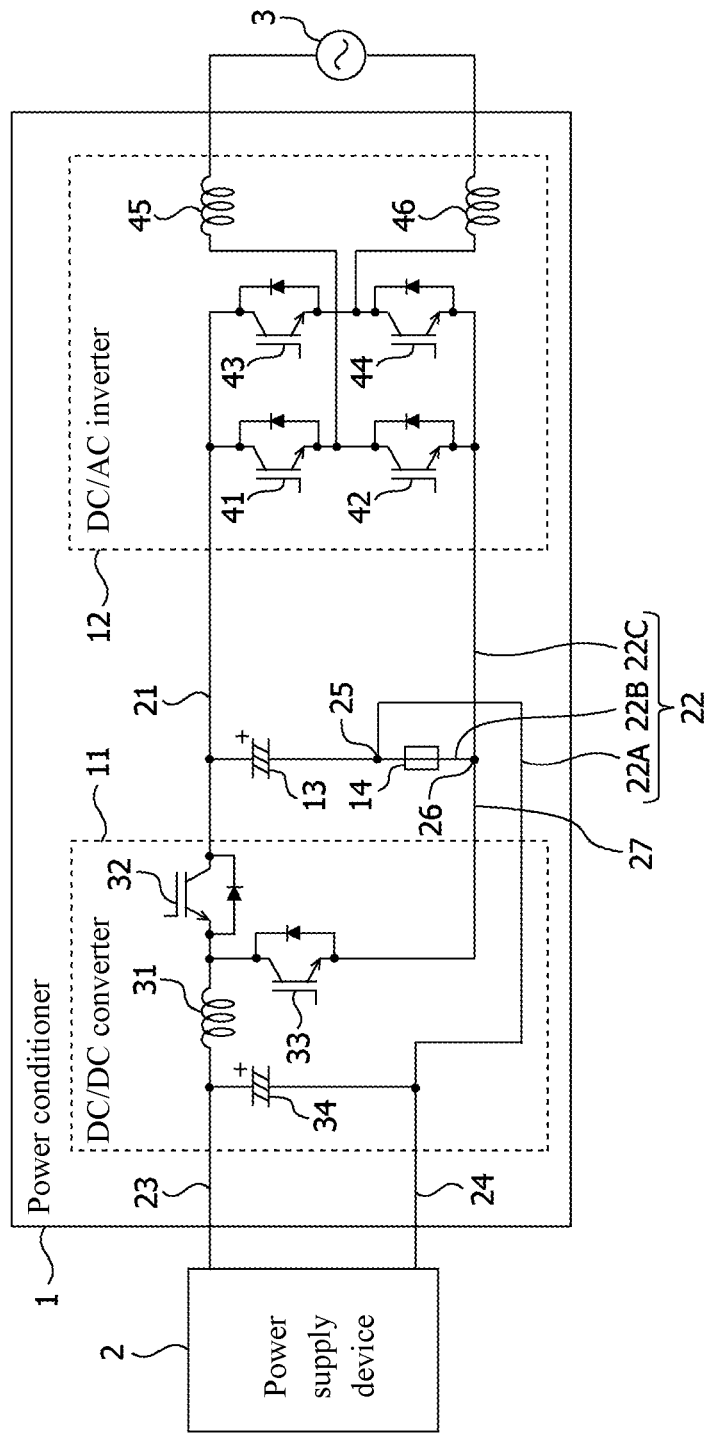
FIG. 1 is a diagram showing an example of a power conditioner according to an embodiment.

First, an example of the scene to which the disclosure is applicable will be described. FIG. 1 is a diagram showing an example of a power conditioner 1 according to the embodiment. The power conditioner 1 includes a DC/DC converter 11 connected to a power supply device 2 and a DC/AC inverter 12 connected to the DC/DC converter 11. The power conditioner 1 is a storage power conditioner, a power conditioner for photovoltaic power generation, a power conditioner for other power generations, etc. The DC/DC converter 11 steps up the voltage of the DC power outputted from the power supply device 2 and steps down the voltage of the DC power outputted from the DC/AC inverter 12. The DC/AC inverter 12 converts the DC power inputted from the DC/DC converter 11 into AC power and outputs the AC power to a power system 3, and the DC/AC inverter 12 converts the AC power outputted from the power system 3 into DC power and outputs the DC power to the DC/DC converter 11.

The power conditioner 1 includes a first plus side wiring (a first power supply wiring) 21, a first minus side wiring (a first ground wiring) 22, a second plus side wiring (a second power supply wiring) 23, and a second minus side wiring (a second ground wiring) 24. The first minus side wiring 22 has a minus side wiring 22A, a minus side wiring 22B, and a minus side wiring 22C. The first plus side wiring 21 and the first minus side wiring 22 connect the DC/DC converter 11 and the DC/AC inverter 12. The second plus side wiring 23 and the second minus side wiring 24 connect the power supply device 2 and the DC/DC converter 11. The power conditioner 1 includes a smoothing capacitor 13 and a fuse 14. The fuse 14 is provided on the first minus side wiring 22. One end (a plus side terminal) of the smoothing capacitor 13 is connected to the first plus side wiring 21, and an other end (a minus side terminal) of the smoothing capacitor 13 is connected to the first minus side wiring 22. The fuse 14 blows when a current exceeding the rating flows through the first minus side wiring 22 and disconnects the first minus side wiring 22.

The DC/DC converter 11 includes a reactor 31, switching elements 32 and 33, and a smoothing capacitor 34. The switching elements 32 and 33 are semiconductor elements such as transistors and MOSFETs. The other end of the smoothing capacitor 13 is connected to a connection point 25 provided on the first minus side wiring 22. The connection point 25 is provided on the boundary between the minus side wiring 22A and the minus side wiring 22B. The connection point 25 is provided on the first minus side wiring 22 on the side of the DC/DC converter 11 with respect to the fuse 14. That is, the connection point 25 is provided on the first minus side wiring 22 extending from the fuse 14 toward the side of the DC/DC converter 11. The switching element 33 is connected to a connection point 26 provided on the first minus side wiring 22 via a connection wiring 27. The connection point 26 is provided on the boundary between the minus side wiring 22B and the minus side wiring 22C. The connection point 26 is provided on the first minus side wiring 22 on the side of the DC/AC inverter 12 with respect to the fuse 14. That is, the connection point 26 is provided on the first minus side wiring 22 extending from the fuse 14 toward the side of the DC/AC inverter 12. Therefore, the fuse 14 is disposed between the connection point 25 and the connection point 26. In this way, the connection point 25 and the connection point 26 are sequentially disposed on the first minus side wiring 22 from the side of the DC/DC converter 11 toward the side of the DC/AC inverter 12. The DC/AC inverter 12 includes switching elements 41, 42, 43 and 44 and reactors 45 and 46.

For example, in a case where the switching elements 32 and 33 are always ON due to the malfunctions or failures of the switching elements 32 and 33, a short circuit occurs in the DC/DC converter 11. Since one end of the smoothing capacitor 13 is connected to the first plus side wiring 21 and the other end of the smoothing capacitor 13 is connected to the connection point 25, a short circuit current occurring in the DC/DC converter 11 flows through the connection wiring 27 and the minus side wiring 22B. In addition, for example, in a case where the switching elements 41 and 42 are always ON due to the malfunctions or failures of the switching elements 41 and 42, a short circuit occurs in the DC/AC inverter 12. Since one end of the smoothing capacitor 13 is connected to the first plus side wiring 21 and the other end of the smoothing capacitor 13 is connected to the connection point 25, a short circuit current occurring in the DC/AC inverter 12 flows through the minus side wiring 22C and the minus side wiring 22B. In a case where a short circuit current exceeding the rating flows through the minus side wiring 22B, the fuse 14 blows, whereby the first minus side wiring 22 is disconnected. In this way, the inflow of abnormal currents from the power conditioner 1 to the power supply device 2 can be suppressed, and the failure of the power supply device 2 can be avoided. Further, the inflow of abnormal currents from the power supply device 2 to the power conditioner 1 can be suppressed, and the failure of the power conditioner 1 can be avoided. In either case of the occurrence of a short circuit in the DC/DC converter 11 or the occurrence of a short circuit in the DC/AC inverter 12, the fuse 14 blows, whereby the first minus side wiring 22 is disconnected. Therefore, according to the embodiment, the number of parts of the power conditioner 1 can be reduced, and the size and cost of the power conditioner 1 can be reduced.

Figure 2:
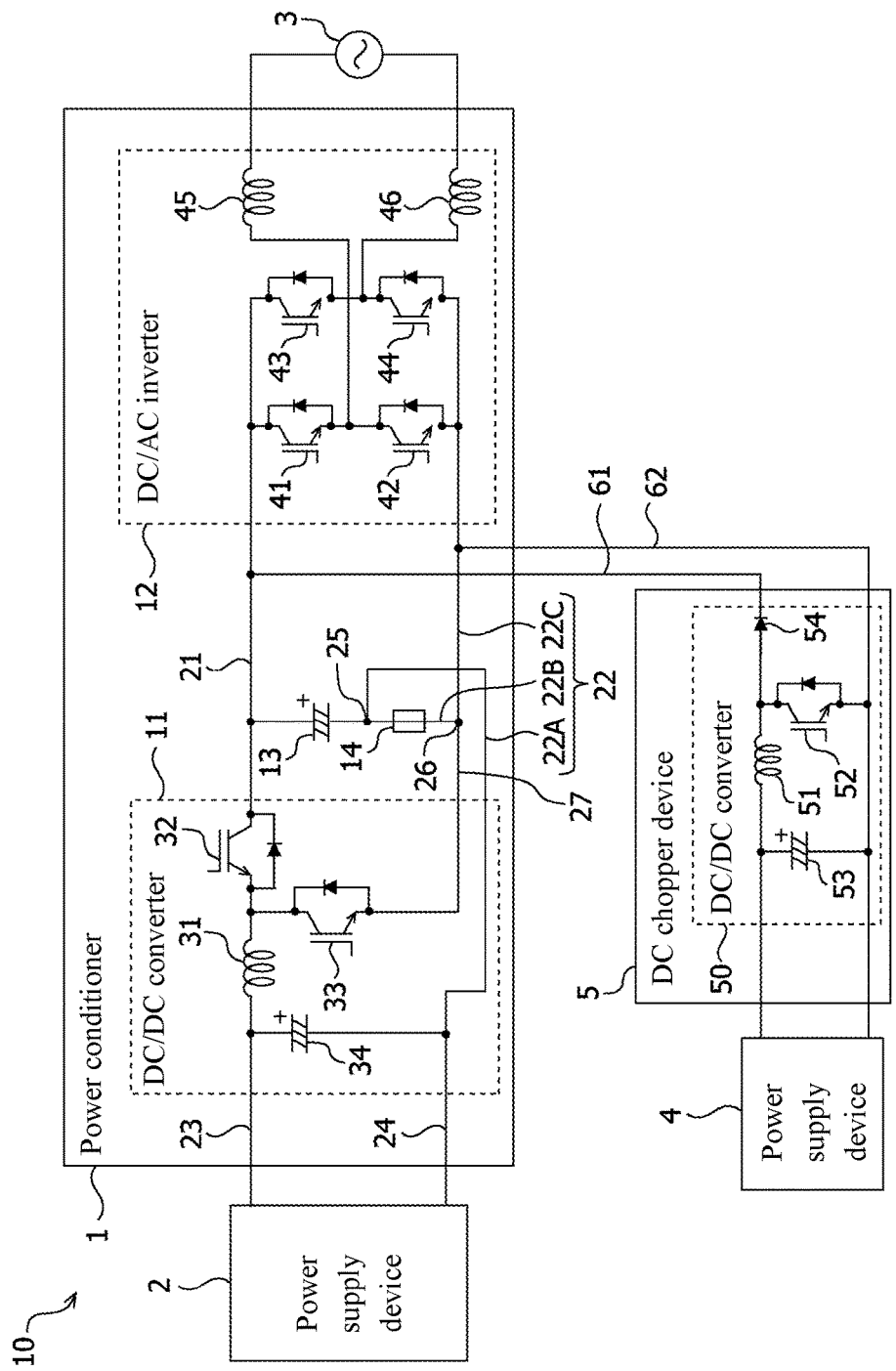
FIG. 2 is a diagram showing an example of a power system according to an embodiment.

With reference to FIG. 1 and FIG. 2, the power conditioner 1 and a power system 10 according to the embodiment will be described. FIG. 1 is a diagram showing an example of the power conditioner 1 according to the embodiment. FIG. 2 is a diagram showing an example of the power system 10 according to the embodiment. The power system 10 includes the power conditioner 1, the power supply device 2, a power supply device 4, and a DC chopper device 5. The DC chopper device 5 is an example of a chopper device. The power conditioner 1 includes the DC/DC converter 11 and the DC/AC inverter 12. The DC/DC converter 11 is an example of a first DC/DC converter. In the example of FIG. 1 and FIG. 2, the DC/DC converter 11 is a bidirectional DC/DC converter. The DC/DC converter 11 is not limited to the example of FIG. 1 and FIG. 2 and may be a step-up converter. In a case where the DC/DC converter 11 is a step-up converter, a diode instead of the switching element 32 is used in the DC/DC converter 11.

The power supply device 2 and the power supply device 4 may be storage battery units having secondary batteries capable of charge and discharge or may be devices capable of power generation (power generation devices). The power supply device 2 is an example of a first power supply device. The power supply device 4 is an example of a second power supply device. A lithium ion battery or various other types of secondary batteries, for example, can be applied as the secondary battery capable of charge and discharge. Examples of the power generation device include a photovoltaic cell (PV) unit, a fuel cell (FC) unit, a wind power generation unit, etc. The DC chopper device 5 includes a DC/DC converter 50 for stepping up the voltage of the DC power outputted from the power supply device 4. The DC/DC converter 50 is an example of a second DC/DC converter. The DC/DC converter 50 includes a reactor 51, a switching element 52, a smoothing capacitor 53, and a diode 54. The DC/DC converter 50 may be a bidirectional DC/DC converter. In this case, the DC/DC converter 50 steps up the voltage of the DC power outputted from the power supply device 4 and steps down the voltage of the DC power outputted from the power conditioner 1. In a case where the DC/DC converter 50 is a bidirectional DC/DC converter, a switching element instead of the diode 54 is used in the DC/DC converter 50. The DC chopper device 5 includes a third plus side wiring 61 and a third minus side wiring 62. The DC chopper device 5 is connected to the power conditioner 1 via the third plus side wiring 61 and the third minus side wiring 62. The DC chopper device 5 is attachable to and detachable from the power conditioner 1. Even in a case where the DC chopper device 5 is not attached to the power conditioner 1, the power conditioner 1 can operate independently. In the example of FIG. 2, the number of the DC chopper device 5 is one, but the number is not limited to the example of FIG. 2. The DC chopper device 5 may be in plurality, and the number of the DC chopper device 5 can be increased or decreased.

In the example of FIG. 2, the third plus side wiring 61 is connected to the first plus side wiring 21, and the third minus side wiring 62 is connected to the minus side wiring 22C. It is not limited to the example of FIG. 2, and the third plus side wiring 61 may be connected to the first plus side wiring 21, and the third minus side wiring 62 may be connected to the connection wiring 27. Further, the third plus side wiring 61 may be connected to the first plus side wiring 21, and the third minus side wiring 62 may be connected to the minus side wiring 22B between the fuse 14 and the connection point 26. One end of the switching element 52 is connected to the diode 54, and one end of the diode 54 is connected to the third plus side wiring 61. An other end of the switching element 52 is connected to the third minus side wiring 62.

Figure 3:
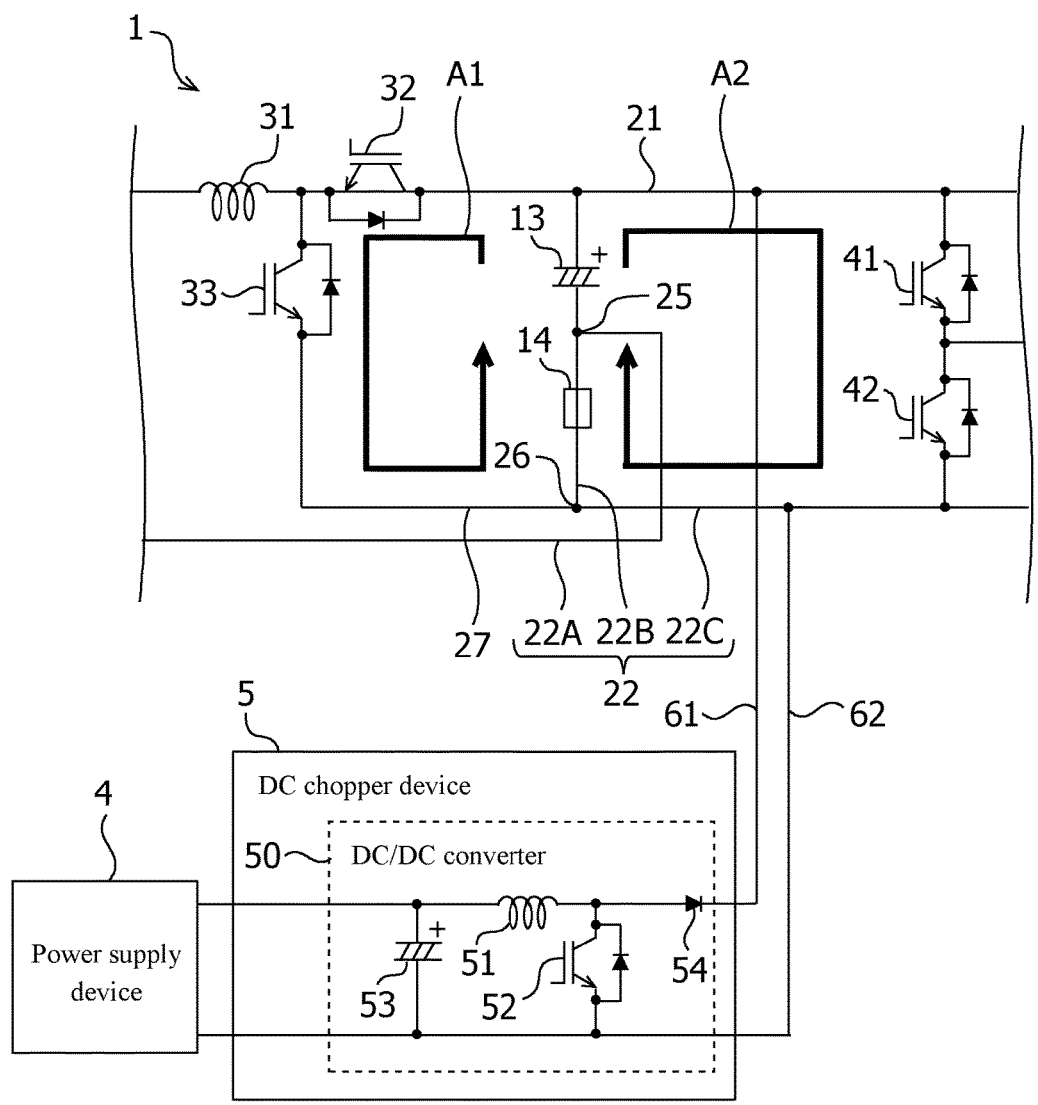
FIG. 3 is an enlarged diagram of the power conditioner.
Figure 4:
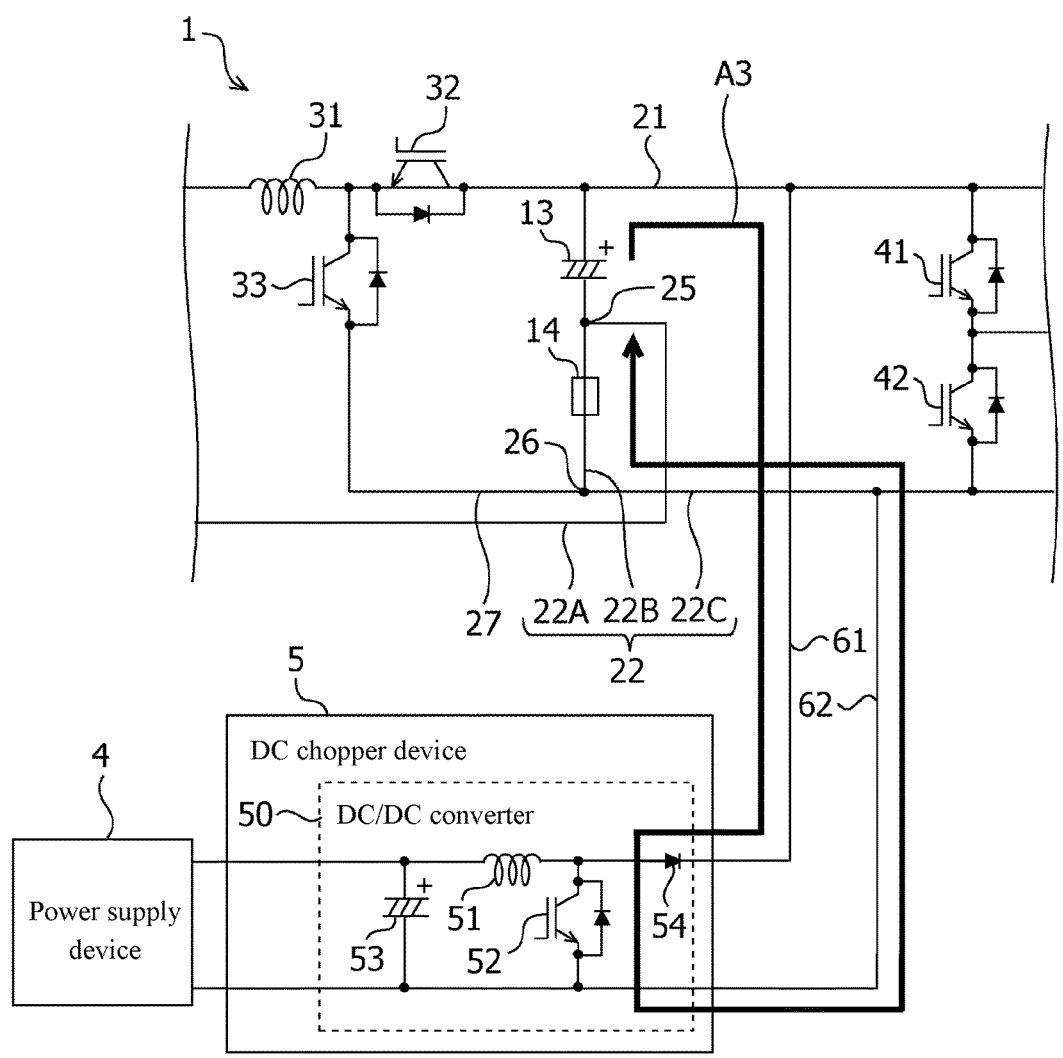
FIG. 4 is an enlarged diagram of the power conditioner.

The occurrence of a short circuit in the DC/DC converter 11, the occurrence of a short circuit in the DC/AC inverter 12, and the occurrence of a short circuit in the DC/DC converter 50 will be described with reference to FIG. 3 and FIG. 4. FIG. 3 and FIG. 4 are enlarged diagrams of the power conditioner 1. The arrow A1 in FIG. 3 indicates a flow of a short circuit current in a case where the switching elements 32 and 33 are always ON due to the malfunctions or failures of the switching elements 32 and 33. In a case where the switching elements 32 and 33 are always ON due to the malfunctions or failures of the switching elements 32 and 33, a short circuit occurs in the DC/DC converter 11. As shown in FIG. 3, since one end of the smoothing capacitor 13 is connected to the first plus side wiring 21 and the other end of the smoothing capacitor 13 is connected to the connection point 25, a short circuit current occurring in the DC/DC converter 11 flows through the connection wiring 27 and the minus side wiring 22B. The fuse 14 is provided on the minus side wiring 22B between the connection point 25 and the connection point 26. Therefore, in a case where a short circuit current exceeding the rating flows through the minus side wiring 22B, the fuse 14 blows, whereby the first minus side wiring 22 is disconnected. In a case where a short circuit occurs in the DC/DC converter 11, the first minus side wiring 22 is disconnected, whereby the inflow of abnormal currents from the power conditioner 1 to the power supply device 2 can be suppressed, and the failure of the power supply device 2 can be avoided. Likewise, the inflow of abnormal currents from the power supply device 2 to the power conditioner 1 can be suppressed, and the failure of the power conditioner 1 can be avoided.

The arrow A2 in FIG. 3 indicates a flow of a short circuit current in a case where the switching elements 41 and 42 are always ON due to the malfunctions or failures of the switching elements 41 and 42. In a case where the switching elements 41 and 42 are always ON due to the malfunctions or failures of the switching elements 41 and 42, a short circuit occurs in the DC/AC inverter 12. As shown in FIG. 3, since one end of the smoothing capacitor 13 is connected to the first plus side wiring 21 and the other end of the smoothing capacitor 13 is connected to the connection point 25, a short circuit current occurring in the DC/AC inverter 12 flows through the minus side wiring 22C and the minus side wiring 22B. The fuse 14 is provided on the minus side wiring 22B between the connection point 25 and the connection point 26. Therefore, in a case where a short circuit current exceeding the rating flows through the minus side wiring 22B, the fuse 14 blows, whereby the first minus side wiring 22 is disconnected. In a case where a short circuit occurs in the DC/AC inverter 12, the first minus side wiring 22 is disconnected, whereby the inflow of abnormal currents from the power conditioner 1 to the power supply device 2 can be suppressed, and the failure of the power supply device 2 can be avoided. Likewise, the inflow of abnormal currents from the power supply device 2 to the power conditioner 1 can be suppressed, and the failure of the power conditioner 1 can be avoided.

The arrow A3 in FIG. 4 indicates a flow of a short circuit current in a case where the switching element 52 is always ON due to the malfunction or failure of the switching element 52 after the diode 54 fails. In a case where the switching element 52 is always ON due to the malfunction or failure of the switching element 52, a short circuit occurs in the DC/DC converter 50. In addition, in the example of FIG. 4, an example of a case where the diode 54 fails is shown. Further, in some cases, a short circuit current may flow as indicated by the arrow A3 in FIG. 4 due to short circuits of the third plus side wiring 61 and the third minus side wiring 62. As shown in FIG. 4, since one end of the smoothing capacitor 13 is connected to the first plus side wiring 21 and the other end of the smoothing capacitor 13 is connected to the connection point 25, a short circuit current occurring in the DC/DC converter 50 flows through the minus side wiring 22C and the minus side wiring 22B. The fuse 14 is provided on the minus side wiring 22B between the connection point 25 and the connection point 26. Therefore, in a case where a short circuit current exceeding the rating flows through the minus side wiring 22B, the fuse 14 blows, whereby the first minus side wiring 22 is disconnected. In a case where a short circuit occurs in the DC/DC converter 50, the first minus side wiring 22 is disconnected, whereby the inflow of abnormal currents from the power conditioner 1 to the power supply device 2 can be suppressed, and the failure of the power supply device 2 can be avoided. Likewise, the inflow of abnormal currents from the power supply device 2 to the power conditioner 1 can be suppressed, and the failure of the power conditioner 1 can be avoided.

In any one of the cases of the occurrence of a short circuit in the DC/DC converter 11, the occurrence of a short circuit in the DC/AC inverter 12, and the occurrence of a short circuit in the DC/DC converter 50, the fuse 14 blows, whereby the first minus side wiring 22 is disconnected. Therefore, according to the embodiment, the number of parts of the power conditioner 1 can be reduced, and the size and cost of the power conditioner 1 can be reduced. Further, according to the embodiment, the number of parts of the power system 10 can be reduced by reducing the number of parts of the DC chopper device 5. As a result, the size and cost of the power system 10 can be reduced.

Here, the corresponding relationship between the DC/DC converter 11 of the power conditioner 1 and the power supply device 2 will be described. In a case where the power supply device 2 is a storage battery unit, a bidirectional DC/DC converter is used as the DC/DC converter 11. In a case where the power supply device 2 is a power generation device, a step-up converter or a bidirectional DC/DC converter is used as the DC/DC converter 11. Further, the corresponding relationship between the DC/DC converter 50 of the DC chopper device 5 and the power supply device 4 will be described. In a case where the power supply device 4 is a storage battery unit, a DC/DC bidirectional converter is used as the DC/DC converter 50. In a case where the power supply device 4 is a power generation device, a step-up converter or a bidirectional DC/DC converter is used as the DC/DC converter 50.

Figure 5:
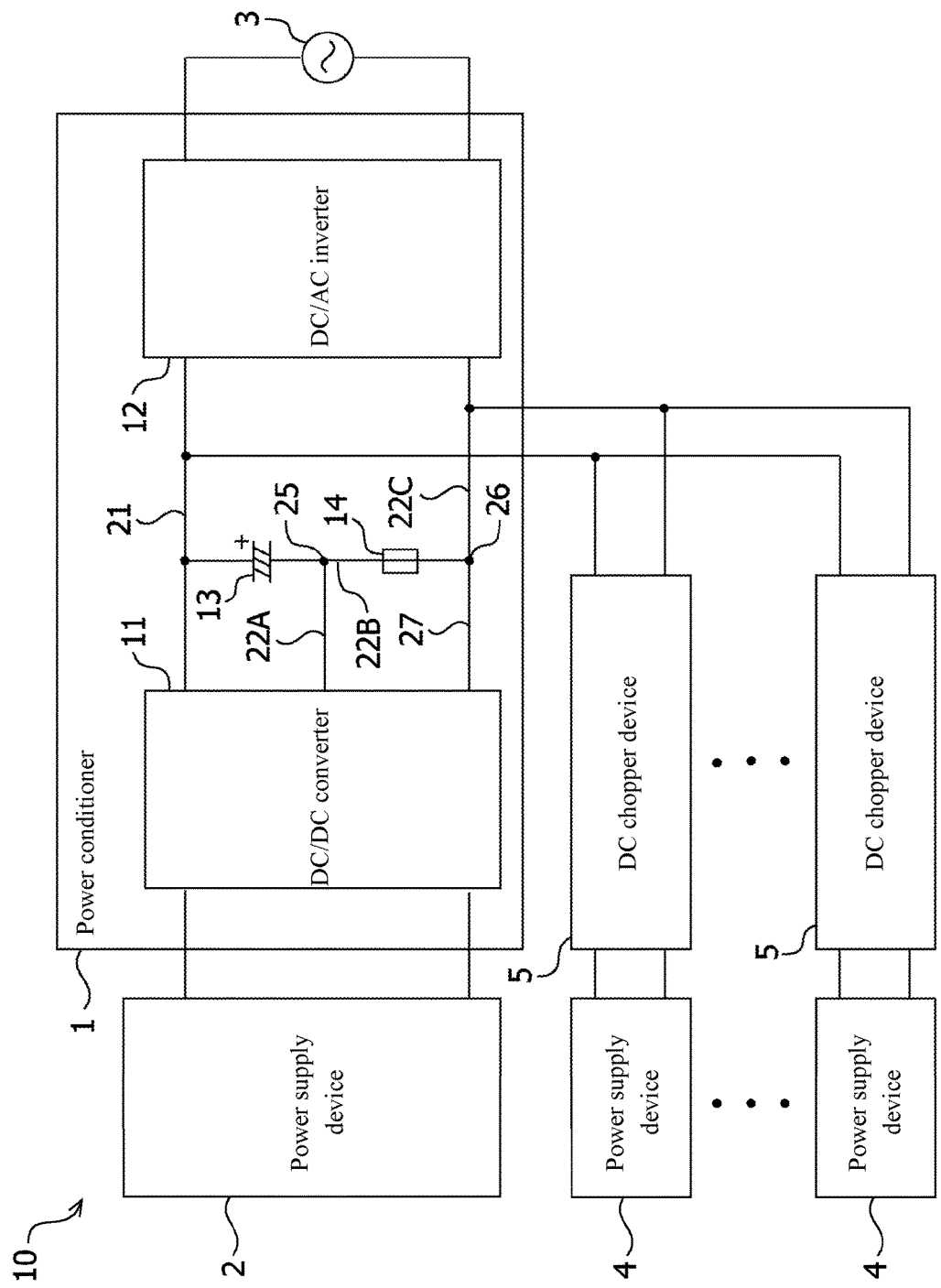
FIG. 5 is a block diagram of the power system according to the embodiment.

FIG. 5 is a block diagram of the power system 10 according to the embodiment. As shown in FIG. 5, a plurality of DC chopper devices 5 may be connected to the power conditioner 1. Each of the DC chopper devices 5 is connected to the first plus side wiring 21 and the minus side wiring 22C. At least one of the plurality of DC chopper devices 5 may be connected to the first plus side wiring 21 and the connection wiring 27. At least one of the plurality of DC chopper devices 5 may be connected to the first plus side wiring 21 and also to the minus side wiring 22B between the fuse 14 and the connection point 26.

Figure 6:
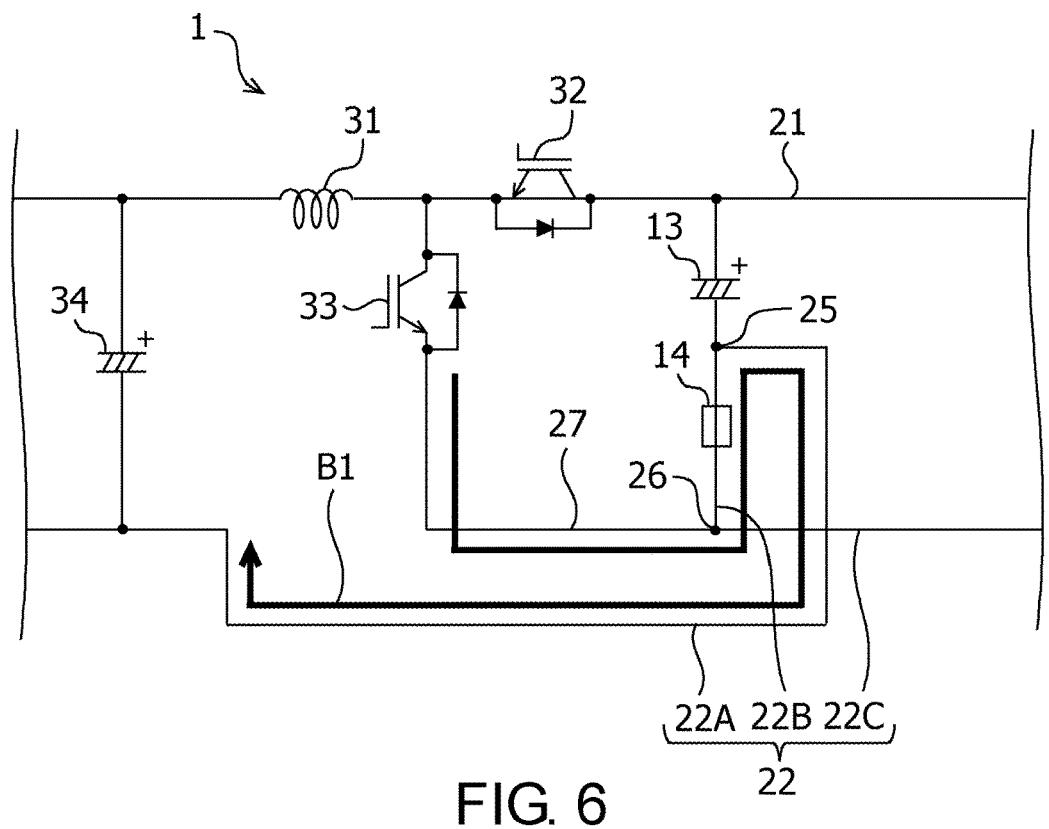
FIG. 6 is an enlarged diagram of the power conditioner.

As described above, the fuse 14 is disposed between the connection point 25 and the connection point 26 in the power conditioner 1. Further, as shown in FIG. 6, the wiring path of the arrow B1 is long in the power conditioner 1. Therefore, as a parasitic inductance and an inductance of the fuse 14 increase, noise in the power conditioner 1 deteriorates. Further, in a case where the switching element 32 is OFF and the switching element 33 is ON, a current flows along the path indicated by the arrow B1 in FIG. 6.

Figure 7:
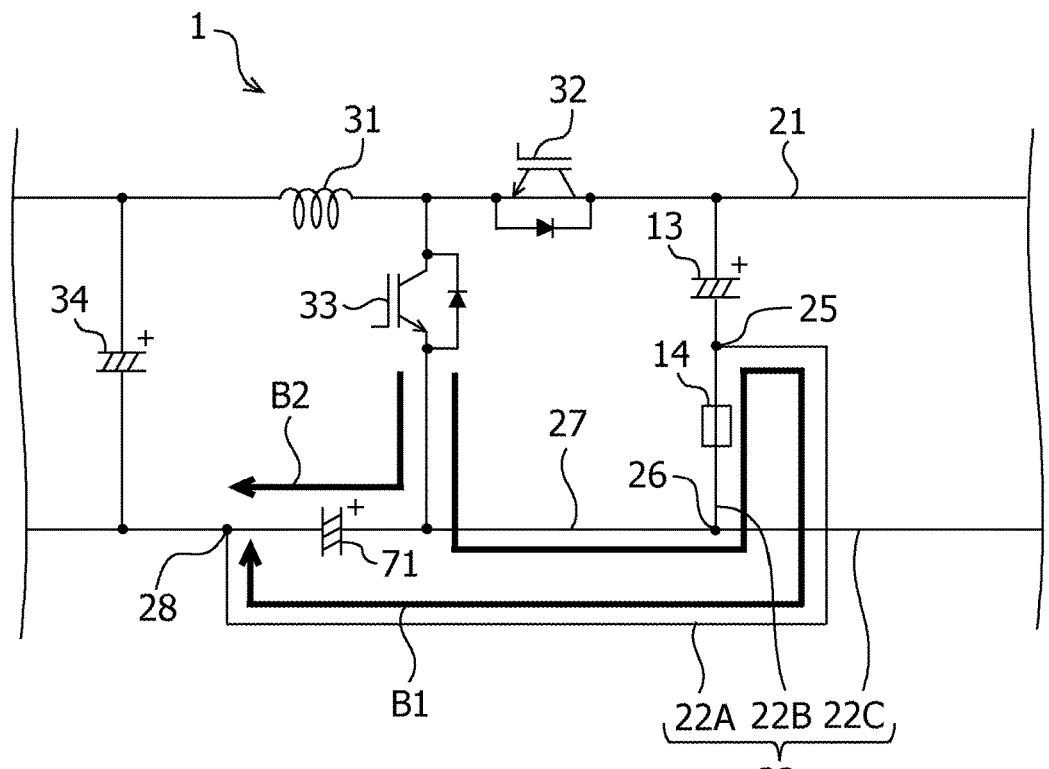
FIG. 7 is an enlarged diagram of the power conditioner.

In the following, the configuration of an embodiment for reducing the noise in the power conditioner 1 will be described. FIG. 7 is an enlarged diagram of the power conditioner 1. As shown in FIG. 7, a capacitor 71 for removing noise is disposed between the minus side wiring 22A and the connection wiring 27. The capacitor 71 removes a high frequency component of DC power. The capacitor 71 may be formed by a conductor pattern on a substrate. One end of the capacitor 71 is connected to the first minus side wiring 22 on the side of the DC/DC converter 11 with respect to the fuse 14, and an other end of the capacitor 71 is connected to the first minus side wiring 22 on the side of the DC/AC inverter 12 with respect to the fuse 14 via the connection wiring 27. Since the capacitor 71 is disposed between the minus side wiring 22A and the connection wiring 27, the high frequency component of the DC power passes through the wirings in the path of the arrow B2 in FIG. 7 but does not pass through the wirings in the path of the arrow B1 in FIG. 7. The high frequency component of the DC power is removed by the capacitor 71, whereby the noise in the power conditioner 1 is reduced.

Figure 8:
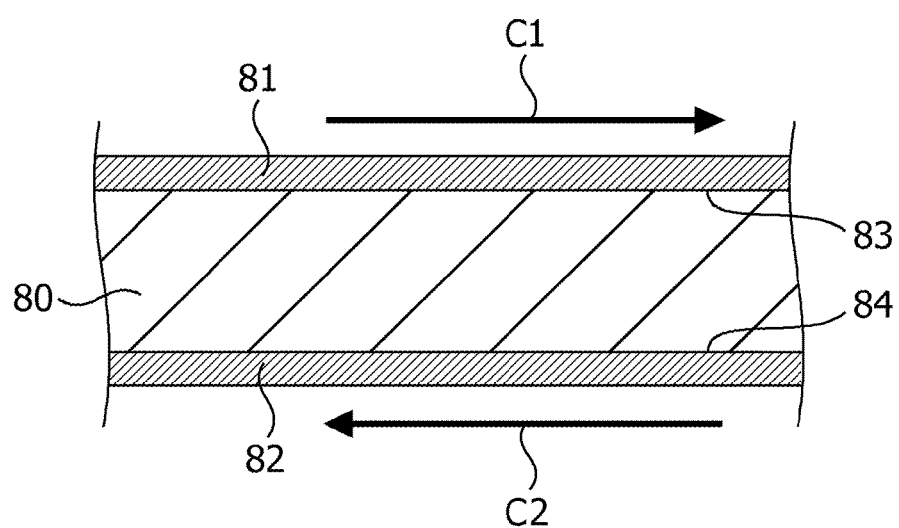
FIG. 8 is a cross-sectional diagram of a substrate included in the power conditioner.
Figure 9:
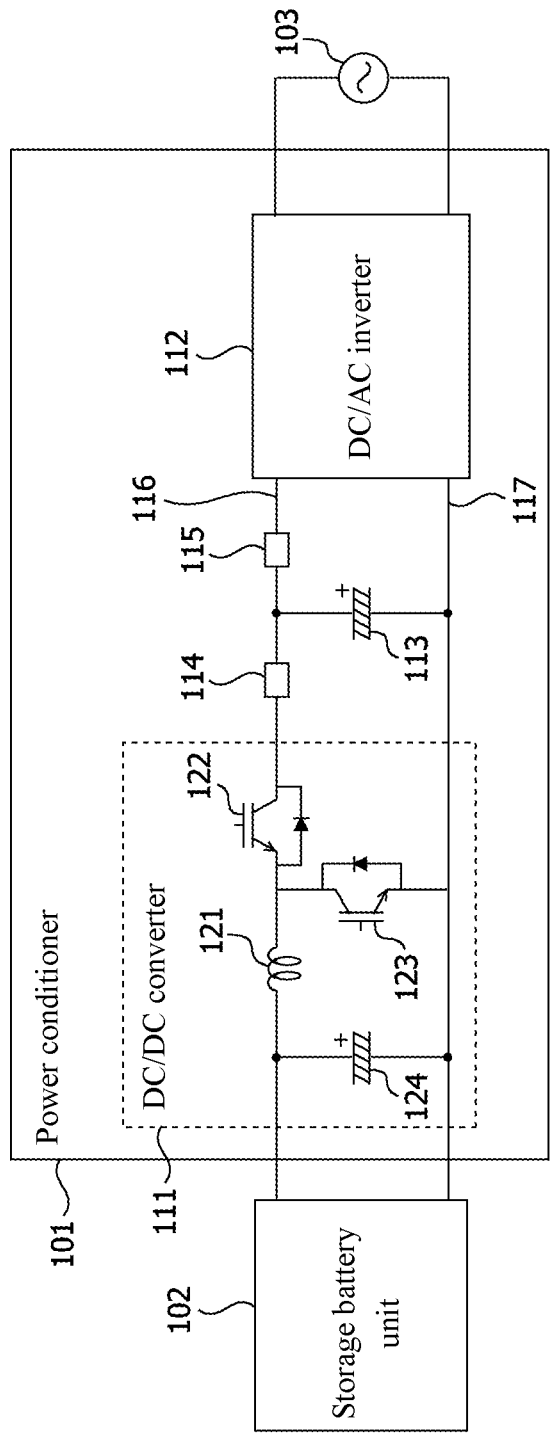
FIG. 9 is a configuration diagram of a conventional power conditioner.

FIG. 8 is a cross-sectional diagram of a substrate 80 included in the power conditioner 1. The power conditioner 1 includes the substrate 80, a first wiring 81, and a second wiring 82. As shown in FIG. 8, the first wiring 81 is formed on a first surface (a front surface) 83 of the substrate 80, and the second wiring 82 is formed on a second surface (a back surface) 84 of the substrate 80. As shown in FIG. 8, the first wiring 81 and the second wiring 82 may overlap when viewed from the normal direction of the first surface 83 (or the normal direction of the second surface 84) of the substrate 80. The second surface 84 of the substrate 80 is a surface opposite to the first surface 83 of the substrate 80. For example, the first wiring 81 and the second wiring 82 may be formed by conductor patterns with respect to the substrate 80. It is not limited to the example of FIG. 8, and the second wiring 82 may be formed on the first surface 83 of the substrate 80, and the first wiring 81 may be formed on the second surface 84 of the substrate 80. Further, a part of the first wiring 81 and a part of the second wiring 82 may overlap when viewed from the normal direction of the first surface 83 (or the normal direction of the second surface 84) of the substrate 80. In this case, directions of currents flowing through the first wiring 81 and the second wiring 82, which overlap in the normal direction of the first surface 83 (or the normal direction of the second surface 84) of the substrate 80, are opposite to each other. In the example of FIG. 8, the direction of the current flowing through the first wiring 81 (the direction of the arrow C1) and the direction of the current flowing through the second wiring 82 (the direction of the arrow C2) are opposite to each other. Therefore, the electric field generated around the first wiring 81 and the electric field generated around the second wiring 82 cancel each other, and the magnetic field generated around the first wiring 81 and the magnetic field generated around the second wiring 82 cancel each other. As a result, parasitic inductances of the first wiring 81 and the second wiring 82, which overlap when viewed from the normal direction of the first surface 83 (or the normal direction of the second surface 84) of the substrate 80, are reduced. As a result, the parasitic inductances of the wirings in the path of the arrow B2 in FIG. 7 are reduced, and the noise in the power conditioner 1 is reduced.

For example, the first wiring 81 may include the wiring from the connection point 25 to a connection point 28 in the path of the arrow B1 in FIG. 7, and the second wiring 82 may include the wiring from the connection point 26 to the connection point 25 in the path of the arrow B1 in FIG. 7. The connection point 28 is provided on the first minus side wiring 22 on the side of the DC/DC converter 11 with respect to the connection point 25. One end of the capacitor 71 is connected to the connection point 28. For example, the first wiring 81 may include the wirings from the fuse 14 to the connection point 28 in the path of the arrow B1 in FIG. 7, and the second wiring 82 may include the wiring from the connection point 26 to the fuse 14 in the path of the arrow B1 in FIG. 7. In this way, the first wiring 81 may include a first part of the first minus side wiring 22, and the second wiring 82 may include a second part of the first minus side wiring 22. The second part of the first minus side wiring 22 is different from the first part of the first minus side wiring 22.

For example, the first wiring 81 may include the wiring from the connection point 25 to the connection point 28 in the path of the arrow B1 in FIG. 7, and the second wiring 82 may include the wirings from the switching element 33 to the connection point 25 in the path of the arrow B1 in FIG. 7. For example, the first wiring 81 may include the wirings from the fuse 14 to the connection point 28 in the path of the arrow B1 in FIG. 7, and the second wiring 82 may include the wirings from the switching element 33 to the fuse 14 in the path of the arrow B1 in FIG. 7. In this way, the first wiring 81 may include the first part of the first minus side wiring 22, and the second wiring 82 may include the connection wiring 27 and the second part of the first minus side wiring 22.

For example, the first wiring 81 may include the wirings from the connection point 26 to the connection point 28 in the path of the arrow B1 in FIG. 7, and the second wiring 82 may include the wirings from the switching element 33 to the connection point 26 in the path of the arrow B1 in FIG. 7. In this way, the first wiring 81 may include the first part of the first minus side wiring 22, and the second wiring 82 may include the connection wiring 27.

The wiring length of the first wiring 81 may be shorter than the wiring length of the second wiring 82. For example, in the path of the arrow B1 in FIG. 7, the wiring length of the wiring from the connection point 25 to the connection point 28 may be shorter than the wiring length of the wirings from the switching element 33 to the connection point 25. Further, the wiring length of the first wiring 81 and the wiring length of the second wiring 82 may be the same. For example, in the path of the arrow B1 in FIG. 7, the wiring length of the wiring from the connection point 25 to the connection point 28 may be the same as the wiring length of the wirings from the switching element 33 to the connection point 25.

According to the power conditioner, in a case where a short circuit occurs in the first DC/DC converter or in the inverter, a short circuit current flows through the minus side wiring between the first connection point and the second connection point. In a case where a short circuit current exceeding the rating flows through the minus side wiring between the first connection point and the second connection point, the fuse provided on the minus side wiring between the first connection point and the second connection point blows, whereby the minus side wiring is disconnected. In this way, the inflow of abnormal currents from the power conditioner to the power supply device can be suppressed, and the failure of the power supply device can be avoided. Further, the inflow of abnormal currents from the power supply device to the power conditioner can be suppressed, and the failure of the power conditioner can be avoided. According to the power conditioner, in either case of the occurrence of a short circuit in the first DC/DC converter or the occurrence of a short circuit in the inverter, the fuse blows, whereby the minus side wiring is disconnected. Therefore, the number of parts of the power conditioner can be reduced, and the size and cost of the power conditioner can be reduced.

In the power conditioner, a plus side connection wiring connected to a second DC/DC converter included in a chopper device is connected to the plus side wiring, and a minus side connection wiring connected to the second DC/DC converter is connected to the minus side wiring on the side of the inverter with respect to the fuse or is connected to a connection wiring for connecting the switching element to the second connection point.

According to the power conditioner, in a case where a short circuit occurs in the second DC/DC converter, a short circuit current flows through the minus side wiring between the first connection point and the second connection point. According to the power conditioner, in any one of the cases of the occurrence of a short circuit in the first DC/DC converter, the occurrence of a short circuit in the inverter, and the occurrence of a short circuit in the second DC/DC converter, the fuse blows, whereby the minus side wiring is disconnected. Therefore, the number of parts of the power conditioner can be reduced, and the size and cost of the power conditioner can be reduced.

In the power conditioner, the first DC/DC converter is a bidirectional DC/DC converter, and the power supply device is a storage battery unit. According to the power conditioner, in a case where a short circuit occurs in the bidirectional DC/DC converter, the minus side wiring is disconnected, whereby the inflow of abnormal currents from the power conditioner to the storage battery unit can be suppressed, and the failure of the storage battery unit can be avoided. Further, the inflow of abnormal currents from the storage battery unit to the power conditioner can be suppressed, and the failure of the power conditioner can be avoided.

The power conditioner includes a second capacitor having one end connected to the minus side wiring on the side of the first DC/DC converter with respect to the fuse and having an other end connected to the minus side wiring on the side of the inverter with respect to the fuse. According to the power conditioner, a high frequency component of DC power is removed by the second capacitor, whereby noise in the power conditioner is reduced.

The power conditioner includes: a substrate; a first wiring formed on a first surface of the substrate; and a second wiring formed on a second surface of the substrate opposite to the first surface, wherein at least a part of the first wiring and at least a part of the second wiring overlap when viewed from a normal direction of the first surface, and directions of currents flowing through the first wiring and the second wiring, which overlap when viewed from the normal direction of the first surface, are opposite to each other, and the first wiring includes a first part of the minus side wiring, and the second wiring includes a second part of the minus side wiring different from the first part, or the second wiring includes the second part and a connection wiring for connecting the switching element to the second connection point, or the second wiring includes the connection wiring. According to the power conditioner, the electric field generated around at least a part of the first wiring and the electric field generated around at least a part of the second wiring cancel each other, and the magnetic field generated around at least a part of the first wiring and the magnetic field generated around at least a part of the second wiring cancel each other. As a result, since parasitic inductances of the first wiring and the second wiring, which overlap when viewed from the normal direction of the first surface of the substrate, are reduced, the noise in the power conditioner is reduced.

According to the power system, in any one of the cases of the occurrence of a short circuit in the first DC/DC converter, the occurrence of a short circuit in the inverter, and the occurrence of a short circuit in the second DC/DC converter, the fuse blows, whereby the minus side wiring is disconnected. Therefore, the number of parts of the power conditioner can be reduced, and the size and cost of the power conditioner can be reduced. Further, the number of parts of the power system can be reduced by reducing the number of parts of the chopper device. As a result, the size and cost of the power system can be reduced.

Effects

According to the disclosure, the number of parts of the power conditioner can be reduced, and the size and cost of the power conditioner can be reduced.

APPENDIX

[1] A power conditioner (1) including a first DC/DC converter (11) connected to a power supply device (2) and an inverter (12) connected to the first DC/DC converter (11), characterized in including:
 a plus side wiring (21) for connecting the first DC/DC converter (11) and the inverter (12);
 a minus side wiring (22) for connecting the first DC/DC converter (11) and the inverter (12);
 a first capacitor (13) having one end connected to the plus side wiring (21) and having an other end connected to the minus side wiring (22); and
 a fuse (14) provided on the minus side wiring (22),
 wherein the first DC/DC converter (11) has at least one switching element (33),
 the other end of the first capacitor (13) is connected to a first connection point (25) provided on the minus side wiring (22) on a side of the first DC/DC converter (11) with respect to the fuse (14), and
 the switching element (33) is connected to a second connection point (26) provided on the minus side wiring (22) on a side of the inverter (12) with respect to the fuse (14).

[2] A power system (10) including a power conditioner (1) and a chopper device (5), characterized in that:
 the power conditioner (1) includes:
 a first DC/DC converter (11) connected to a first power supply device (2) and having at least one switching element (33);
 an inverter (12) connected to the first DC/DC converter (11);
 a plus side wiring (21) for connecting the first DC/DC converter (11) and the inverter (12);
 a minus side wiring (22) for connecting the first DC/DC converter (11) and the inverter (12);
 a capacitor (13) having one end connected to the plus side wiring (21) and having an other end connected to the minus side wiring (22);
 a fuse (14) provided on the minus side wiring (22); and
 a connection wiring (27) for connecting the switching element (33) to the minus side wiring (22), the chopper device (5) includes:
 a second DC/DC converter connected to a second power supply device (4);
 a plus side connection wiring (61) connected to the second DC/DC converter; and
 a minus side connection wiring (62) connected to the second DC/DC converter,
 the other end of the capacitor (13) is connected to a first connection point (25) provided on the minus side wiring (22) on a side of the first DC/DC converter (11) with respect to the fuse (14),
 the switching element (33) is connected to a second connection point (26) provided on the minus side wiring (22) on a side of the inverter (12) with respect to the fuse (14),
 the plus side connection wiring (61) is connected to the plus side wiring (21), and
 the minus side connection wiring (62) is connected to the minus side wiring (22) on the side of the inverter (12) with respect to the fuse (14) or is connected to the connection wiring (27).

What is claimed is:

1. A power conditioner comprising a first DC/DC converter connected to a power supply device and an inverter connected to the first DC/DC converter, characterized in comprising:
 a plus side wiring for connecting the first DC/DC converter and the inverter;
 a minus side wiring for connecting the first DC/DC converter and the inverter;
 a first capacitor having one end connected to the plus side wiring and having an other end connected to the minus side wiring; and
 a fuse provided on the minus side wiring,
 wherein the first DC/DC converter has at least one switching element,
 the other end of the first capacitor is connected to a first connection point provided on the minus side wiring on a side of the first DC/DC converter with respect to the fuse, and
 the switching element is connected to a second connection point provided on the minus side wiring on a side of the inverter with respect to the fuse.

2. The power conditioner according to claim 1, wherein, a plus side connection wiring connected to a second DC/DC converter included in a chopper device is connected to the plus side wiring, and
 a minus side connection wiring connected to the second DC/DC converter is connected to the minus side wiring on the side of the inverter with respect to the fuse or is connected to a connection wiring for connecting the switching element to the second connection point.

3. The power conditioner according to claim 2, wherein, the first DC/DC converter is a bidirectional DC/DC converter, and
 the power supply device is a storage battery unit.

4. The power conditioner according to claim 2, comprising:
 a second capacitor having one end connected to the minus side wiring on the side of the first DC/DC converter with respect to the fuse and having an other end connected to the minus side wiring on the side of the inverter with respect to the fuse.

5. The power conditioner according to claim 2, comprising:
 a substrate;
 a first wiring formed on a first surface of the substrate; and a second wiring formed on a second surface of the substrate opposite to the first surface, wherein at least a part of the first wiring and at least a part of the second wiring overlap when viewed from a normal direction of the first surface, directions of currents flowing through the first wiring and the second wiring, which overlap when viewed from the normal direction of the first surface, are opposite to each other, the first wiring comprises a first part of the minus side wiring, and the second wiring comprises a second part of the minus side wiring different from the first part, or the second wiring comprises the second part and a connection wiring for connecting the switching element to the second connection point, or the second wiring comprises the connection wiring.

6. The power conditioner according to claim 1, wherein, the first DC/DC converter is a bidirectional DC/DC converter, and the power supply device is a storage battery unit.

7. The power conditioner according to claim 6, comprising:

a second capacitor having one end connected to the minus side wiring on the side of the first DC/DC converter with respect to the fuse and having an other end connected to the minus side wiring on the side of the inverter with respect to the fuse.

8. The power conditioner according to claim 6, comprising:

a substrate;

a first wiring formed on a first surface of the substrate; and a second wiring formed on a second surface of the substrate opposite to the first surface, wherein at least a part of the first wiring and at least a part of the second wiring overlap when viewed from a normal direction of the first surface, directions of currents flowing through the first wiring and the second wiring, which overlap when viewed from the normal direction of the first surface, are opposite to each other, the first wiring comprises a first part of the minus side wiring, and the second wiring comprises a second part of the minus side wiring different from the first part, or the second wiring comprises the second part and a connection wiring for connecting the switching element to the second connection point, or the second wiring comprises the connection wiring.

9. The power conditioner according to claim 1, comprising:

a second capacitor having one end connected to the minus side wiring on the side of the first DC/DC converter with respect to the fuse and having an other end connected to the minus side wiring on the side of the inverter with respect to the fuse.

10. The power conditioner according to claim 9, comprising:

a substrate;

a first wiring formed on a first surface of the substrate; and a second wiring formed on a second surface of the substrate opposite to the first surface, wherein at least a part of the first wiring and at least a part of the second wiring overlap when viewed from a normal direction of the first surface, directions of currents flowing through the first wiring and the second wiring, which overlap when viewed from the normal direction of the first surface, are opposite to each other, the first wiring comprises a first part of the minus side wiring, and the second wiring comprises a second part of the minus side wiring different from the first part, or the second wiring comprises the second part and a connection wiring for connecting the switching element to the second connection point, or the second wiring comprises the connection wiring.

11. The power conditioner according to claim 1, comprising:

a substrate;

a first wiring formed on a first surface of the substrate; and a second wiring formed on a second surface of the substrate opposite to the first surface, wherein at least a part of the first wiring and at least a part of the second wiring overlap when viewed from a normal direction of the first surface, directions of currents flowing through the first wiring and the second wiring, which overlap when viewed from the normal direction of the first surface, are opposite to each other, the first wiring comprises a first part of the minus side wiring, and the second wiring comprises a second part of the minus side wiring different from the first part, or the second wiring comprises the second part and a connection wiring for connecting the switching element to the second connection point, or the second wiring comprises the connection wiring.

12. A power system comprising a power conditioner and a chopper device, characterized in that:

the power conditioner comprises:

a first DC/DC converter connected to a first power supply device and having at least one switching element;

an inverter connected to the first DC/DC converter;

a plus side wiring for connecting the first DC/DC converter and the inverter;

a minus side wiring for connecting the first DC/DC converter and the inverter;

a capacitor having one end connected to the plus side wiring and having an other end connected to the minus side wiring;

a fuse provided on the minus side wiring; and a connection wiring for connecting the switching element to the minus side wiring, the chopper device comprises:

a second DC/DC converter connected to a second power supply device;

a plus side connection wiring connected to the second DC/DC converter; and a minus side connection wiring connected to the second DC/DC converter, the other end of the capacitor is connected to a first connection point provided on the minus side wiring on a side of the first DC/DC converter with respect to the fuse, the switching element is connected to a second connection point provided on the minus side wiring on a side of the inverter with respect to the fuse, the plus side connection wiring is connected to the plus side wiring, the minus side connection wiring is connected to the minus side wiring on the side of the inverter with respect to the fuse or is connected to the connection wiring.

\* \* \* \* \*